March 17, 1942. W. H. GREEN 2,276,300
LIQUID TREATING PROCESS AND APPARATUS
Filed May 23, 1938
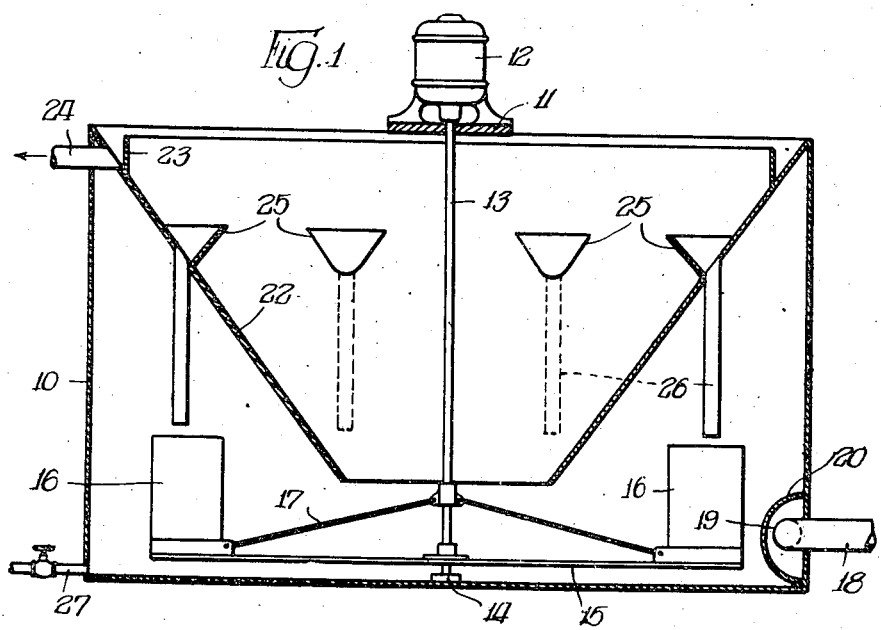
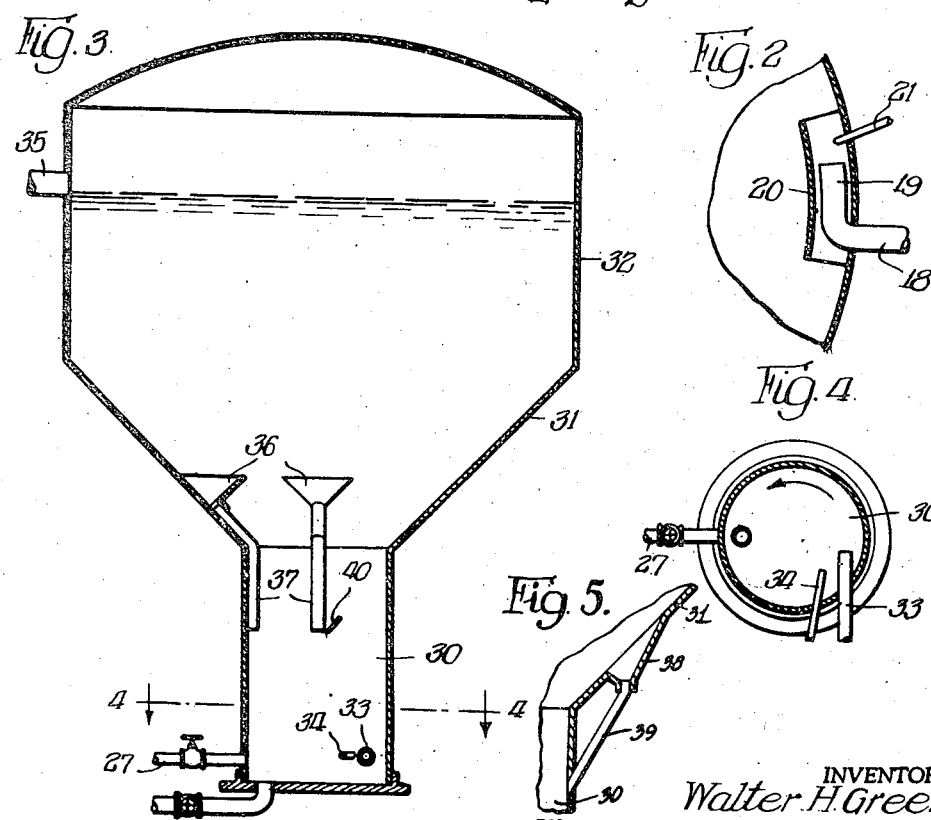
INVENTOR.
Walter H. Green,
BY Cromwell, Greist & Warden
ATTORNEYS.

Patented Mar. 17, 1942

2,276,300

UNITED STATES PATENT OFFICE 2,276,300

LIQUID TREATING PROCESS AND APPARATUS

Walter H. Green, Chicago, Ill., assignor to International Filter Co., Chicago, Ill., a corporation of Delaware Application May 23, 1938, Serial No. 209,432

7 Claims. (Cl. 210—16)

The present invention relates to an improved method and apparatus for the treatment of liquids to remove substances therefrom in solid form and refers in particular to the softening, clarification and stabilization of water by the continuous formation, conditioning and removal of precipitates. The invention will be described with reference to this particular application.

In the treatment of hard water it heretofore has been suggested to produce the softening reaction and clarification in a continuous manner, the reaction occurring in part at least in a body of water to which is imparted rotary motion. The treated water was passed from the reaction zone into an upwardly expanding separation zone in which the solids separated from the water to fall downwardly against the upwardly rising current.

A principal object of the present invention is an improvement upon continuous softening processes of the type described having a rotary circulation pattern in the reaction zone, the improvement including a return to the reaction zone of separated solids by a route other than the principal upflow of the water being treated.

An additional object of the invention is the provision of a method and apparatus for treating liquids in the manner described in which there is established in a body of water a concentrated rotating slurry consisting of solids removed from previously treated water, raw water and chemicals being introduced into the body of rotating slurry adjacent the lower portion thereof and solids being returned to the slurry from an upper separation zone.

Still another object of the invention includes the provision of a reaction chamber in which is established a lower slurry of particles previously precipitated from hard water and an upper upwardly expanding clarification compartment having a main communication with the reaction chamber and other and different communications for the return of solids from the clarification compartment to the reaction chamber, the apparatus and the method involved in this operation preferably including the introduction of water and softening reactants directly into the body of the slurry so that the softening reaction can occur in the presence of previously precipitated solids and there can be obtained a rapid, definite and controllable intermixture of raw water with the slurry.

An additional object is the softening of water by reaction in a rotating body of slurry contained in the lower portion of a treating tank followed by displacement of the treated water upwardly into an outwardly expanding clarification chamber, and the diverse return of solids separated in the clarification chamber to the reaction zone by routes different from the path of travel of water displaced upwardly into the clarification zone from the reaction chamber.

These and other objects will be observed upon a consideration of the following description and by reference to the accompanying drawing, in which Fig. 1 is a cross-sectional view of apparatus suitable for carrying out the invention;

Fig. 2 is a fragmentary top view of the raw water inlet of the apparatus shown in Fig. 1;

Fig. 3 is a cross-sectional view of a modified form of the apparatus;

Fig. 4 is a sectional view taken along line 4—4 of Fig. 3; and

Fig. 5 is a vertical section of a modification of the funnel 36 shown in Fig. 3.

As before stated, the process of the present invention is an improvement over a prior process in which the water softening reaction occurs in the presence of suspended particles of previously precipitated solids contained in a rotating body of liquid, the water being displaced upwardly into a clarification zone and separated solids passing downwardly against the upflow current. This prior type of process is described in my prior patent, No. 1,702,257, issued February 19, 1929, and again in Spaulding Patent No. 2,021,672. In the latter patent the rotary motion is imparted to the water by mechanical paddles which revolve slowly. This rotary motion is imparted to the water in my prior patent by directing a tangential stream of water into the reaction zone. In both cases the separated solids settle back from an upwardly expanding clarification zone against the upward current.

I now have discovered that this type of process greatly may be improved by providing a different path of travel of separated solids back to a reaction zone, so that there can be a positive circulation of the solids.

The apparatus shown in Fig. 1 is similar in some respects to that described in Patent No. 2,021,672. It includes a treating tank indicated generally at 10, which may be of cylindrical construction. Across the top of the tank is provided a frame member 11 which carries a motor 12 having a downwardly extending shaft 13. The bottom of shaft 13 is journaled as indicated at 14 in the bottom of the tank. Adjacent the bottom of the tank are mounted a plurality of horizontal agitating arms 15 which extend outwardly in the manner shown. The ends of arms 15 carry paddles 16, the arms and paddles being further supported by brace rods 17 extending from adjacent the ends of arms 15 to the shaft 13.

A raw water inlet is indicated at 18, this inlet being positioned adjacent the bottom of the tank and extending alongside the inner portion of the tank, as shown in Fig. 2, to provide a jet-like discharge into the tank, the discharge section 19 preferably being turned in the same direction as the direction of rotation of paddles 16. About and spaced from the inlet conduit for the raw water is provided a sleeve section 20 which is open at both ends to provide for passage of liquid therethrough by the projecting effect of the discharge of raw water through connection 19. In front of the discharge connection 19 for the raw water is provided a conduit 21 through which softening chemicals such as lime and soda or other precipitation aids such as coagulants may be added. It also is possible to place the chemical inlet line 21 to the rear of the discharge section 19 so that the chemicals become mixed with circulated liquid in the sleeve 20 before contact with the raw water.

Extending downwardly from the top of the tank 10 is a truncated conical separating member 22, the lower end of which is in a plane spaced somewhat above the bottom of the tank. An annular weir 23 is mounted in the upper portion of the separator 22 and a line 24 is provided to draw off water spilling over the top of the weir 23.

In operation of the process raw water and chemicals are discharged into the tank 10 and the shaft 13 is set in rotation to provide in the tank a pattern of circulation which includes a general rotary movement within the tank and local eddy currents occasioned by the slightly more rapid rate of rotation of the agitator than the water and by the addition of the raw water through the line 18. It will be noted that the raw water is added to this rotary flow and directly becomes mixed with circulated water in the tank. The chemicals with which the raw water is treated cause a precipitation of the hardness-imparting constituents of the raw water as calcium carbonate and magnesium hydroxide. As the tank fills, the water which is recirculated past the raw water inlet by the rotary movement within the tank contains previously precipitated solids. The reaction between the raw water and the chemicals occurs within the tank and thus takes place in the presence of the previously formed solids contained in the recirculated water. Effecting the reaction in this manner causes a building up of the size of the suspended particles into crystalline clusters which are coherent and considerably larger than are normally obtained in a continuous softener wherein there is no return of the previously precipitated solids.

The water within the treating tank is displaced inwardly and upwardly into the clarifying cone 22. In this cone 22 the agitation which is maintained in the tank 10 is reduced or even stopped so that there is a slow upward rate of rise. Suitable baffles (not shown) may be used to cut down the rotary motion in the cone. As the cone 22 increases in cross-sectional area toward the top of the tank the rate of rise of the water decreases and the water reaches a point at which the rate of upward flow is sufficiently slow to allow for separation of the crystalline particles contained in the water. In accordance with the present invention there is provided a return of these crystalline particles to the reaction zone in the lower part of the tank, the return being effected by a different route than the main path of travel of the water entering the cone.

As shown in Fig. 1, there are provided a number of return funnels 25 forming a communication between the cone and the reaction and mixing zone. The down pipes 26 extend from funnels 25 to a point just above the agitator paddles 16. The particular location of the funnels or separators 25 may vary considerably. Their location preferably is adjacent the plane at which the solids separate from the water passing upwardly. The crystalline particles of hardness-imparting constituents pass downwardly through the separators 25 and the return pipes 26.

Return of the solids in this manner sets up a circulatory movement of the solids, so that the concentration of solids in the reaction zone increases to such an extent that there is formed in the tank a relatively thick slurry of suspended particles in which the solids content may be of the order or 2 or 3 per cent. As the solids settle into the funnels 25 the density of the body of liquid in the funnels becomes greater than the density of the liquid elsewhere in the apparatus. This greater density causes a downward flow through the funnels 25 and spouts 26. It is possible to omit the spouts 26 and provide merely a funnel 25 opening into the reaction zone. This is less desirable, since there is a smaller column of relatively high density liquid and the flow through the funnel thereby is decreased.

Any suitable means may be provided for withdrawing solids from the reaction zone to prevent undue accumulation. There is indicated an outlet conduit 27 through which the slurry in the tank may be removed as desired. The high concentration of solids may be maintained substantially constant by the removal of a relatively small volume of slurry as compared with the volume of the raw water being treated.

The embodiment of the apparatus shown in Figs. 3 and 4 is constructed somewhat as described in my prior Patent No. 1,702,257. In this apparatus the pattern of circulation resembles the pattern of circulation characteristic of the apparatus shown in Fig. 1. That is, there is a general rotary movement of the liquid in the reaction zone. The treating tank of Fig. 3 has a lower reaction chamber 30 and an upper truncated cone clarifying chamber 31. To provide added storage space there also is provided an upper cylindrical section 32.

Raw water is introduced into the reaction chamber 30 through the line 33, the latter being positioned non-radially so as to set up a general rotary motion in the liquid of the reaction zone. Treating chemicals are added to the reaction zone through the line 34, this line preferably being positioned back of the outlet end of line 33 so that the chemicals are admixed with the liquid in the reaction zone before contact with the raw water.

As the clarification process starts with the type of apparatus shown in Figs. 3 and 4, raw water is passed inwardly through line 33 and the chemicals are added through line 34 to produce the softening reaction. The water in the treating chamber 30 passes upwardly in a general rotary movement which decreases toward the top of the treating tank and as the treated water expands upwardly in the clarification chamber 31 its upward rate of rise decreases to such an extent that the solids precipitated in the softening reaction cease to rise. This results in clarified water passing upwardly into the storage compartment 32 from which it is withdrawn through line 35.

The solids which thus are separated from the water in the clarification chamber 31 subside into the funnels 36, thereby increasing the specific gravity of the liquid in these funnels and causing a downward flow of the solids into the reaction chamber 30 by a different route than the path of travel of the water rising upwardly from the reaction zone into the clarification zone. The flow from the funnels 36 is through the downwardly extending pipes 37. In Figure 5 of the drawing there is shown a different type of funnel 38 which extends below the general surface of the clarification zone 31 and is provided with an outside pipe 39 for returning solids to the reaction zone. This construction is shown to indicate possible alternative forms of the apparatus.

As in the case of the apparatus shown in Fig. 1 the apparatus shown in Fig. 3 provides a pattern of circulation in which there is a general rotary flow in the mixing and reaction zone, a relatively slow and expanding upward flow to effect separation of clear water from the suspended particles, and a return flow of the particles through a series of distribution pipes back to the reaction zone. There desirably may be a circulation of liquid through the distribution pipes along with the suspended particles. Stream-projecting impellers may be utilized if necessary in the distribution pipes to enhance this flow and circulation from the separation zone back to the reaction zone. A deflector such as shown at 40 may be utilized to create a downward current through pipes 37, the rotating water in the reaction zone deflecting from the member 40 and thereby drawing water through the pipe.

Introduction of the raw water into the lower portion of the reaction zone provides for direct and thorough admixture of the water with slurry before the softening or stabilizing is complete. A prompt mixture of the water and chemicals assists in the formation of the desired type of crystalline particles, as does admixture of the chemicals with the slurry prior to contact with the raw water. These factors fit in with the pattern of circulation described in the embodiments of the invention presented herein to provide rapid and effective treatment of water containing calcium and magnesium compounds.

Various changes in the process and apparatus described herein for purposes of explanation coming within the scope of the invention are intended to be included in the appended claims.

I claim:

1. Apparatus of the type described, comprising a reaction chamber having means for setting a liquid therein in rotary agitative motion, an upwardly expanding clarification chamber having a lower main communication with said reaction chamber, diverse downwardly extending conduits extending from above said main communication to said reaction chamber, and means for withdrawing liquid from said clarification chamber above said conduits.

2. Apparatus of the type described, comprising a mixing and reaction chamber, means for rotatively agitating liquid in said chamber, an upwardly expanding clarification chamber having a lower main communication with said reaction chamber and an upper communication with said chamber, means for inducing a flow of liquid from said clarification chamber through said upper communication and into said reaction chamber, and means for withdrawing liquid from said clarification chamber above said upper communication.

3. Apparatus of the type described, comprising a mixing and reaction chamber, means for delivering water to be treated and treating reagent to said chamber, means for rotatively agitating liquid in said reaction chamber, an upwardly expanding clarification chamber having an inlet in the lower part thereof communicating with said reaction chamber, a pocket member having its upper end in open communication with said clarification chamber above the inlet into said chamber and having a discharge communication from the lower part of said pocket into said reaction chamber, means for discharging solids to waste from said mixing and reaction chamber, and means for withdrawing liquid from said clarification chamber above the level of the upper edge of said pocket member.

4. Apparatus of the type described, comprising a mixing and reaction chamber, means for delivering water to be treated and a treating reagent to said chamber, means for rotatively agitating liquid in said reaction chamber, an upwardly expanding clarification chamber having an inlet into the lower portion thereof communicating with said reaction chamber, means for withdrawing liquid from the upper portion of said clarification chamber, and a solids collecting pocket within said clarification chamber provided with an upper communication with said clarification chamber and located intermediate said inlet and said liquid withdrawing means, an outlet from the lower portion of said pocket discharging into said reaction chamber below said upper communication for the delivery of concentrated solids from said clarification chamber into said reaction chamber by a path different from the upward flow of water from the mixing and reaction zone into the clarification zone.

5. The apparatus of claim 3 wherein the means for delivering water to be treated and treating reagent discharge into the reaction chamber below the level of the inlet into the clarification chamber.

6. Apparatus of the type described comprising a reaction chamber, means for discharging water tangentially into said chamber, an upwardly expanding clarification chamber having a lower main communication with said reaction chamber, means for withdrawing clarified water from the upper portion of said clarification chamber, a plurality of conduits leading from points in said clarification chamber intermediate said lower main communication and said withdrawal means and extending downwardly into said reaction chamber, means for discharging a reactant into said reaction chamber, and means for discharging solids to waste from the lower portion of said reaction chamber.

7. Apparatus of the type described comprising a reaction chamber, means for discharging water tangentially into said chamber, an upwardly expanding clarification chamber having a lower main communication with said reaction chamber, means for withdrawing clarified water from the upper portion of said clarification chamber, a plurality of pocket like members in open communication with said clarification chamber and located at a level intermediate said lower main communication and said clarified water withdrawal means, a conduit from the lower portion of each such pocket member extending downwardly into and in communication with the reaction chamber, means for discharging a reactant into said reaction chamber, means for inducing a downward flow of liquid from said clarification chamber through said conduits into said reaction chamber, and means for discharging solids to waste from the lower portion of said reaction chamber.

WALTER H. GREEN.